April 25, 1967 L. C. SOLBERG 3,315,539
AUTOMOBILE IDLER
Filed May 10, 1965

INVENTOR
*Loren C. Solberg*

United States Patent Office 3,315,539
Patented Apr. 25, 1967

3,315,539
AUTOMOBILE IDLER
Loren C. Solberg, 1104 Platte Ave.,
Alliance, Nebr. 69301
Filed May 10, 1965, Ser. No. 454,289
1 Claim. (Cl. 74—532)

This invention relates to automobile accessories and more particularly to a device for changing the idle r.p.m. of the vehicle engine.

It is therefore the main purpose of this invention to provide a car idler device which will aid the driver, particularly in cold weather to keep the engine running after he removes his foot from the accelerator.

Another object of this invention is to provide a car idler which will be used when the battery is low by increasing the speed of the idle in order that the battery may charge more quickly.

Another object of this invention is to provide a car idler which will be useful on trucks and other vehicles that use chokes to make them idle faster, by preventing excess waste of gas and simultaneously preventing the engines from becoming logged with gas.

Still another object of this invention is to provide a car idler which will be quickly and easily installed and will have bracket means to urge against the seat while a pointed and threaded shaft is adjustable and will contact the accelerator or gas pedal and allow the idle speed to set where desired.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
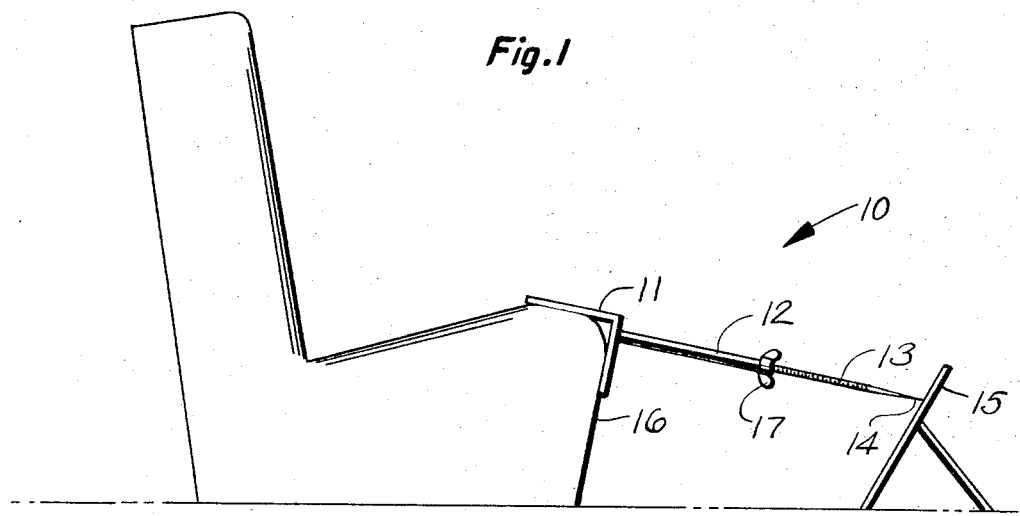
FIGURE 1 is a side view of this invention shown in operative use.
Figure 2:
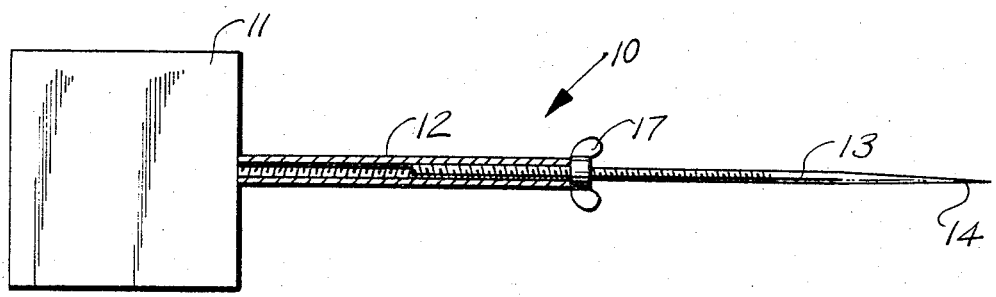
FIGURE 2 is a top plan view of the device shown enlarged and removed from FIGURE 1.

According to this invention, a car idler 10 is provided with an L-shaped bracket 11 made of metal or other suitable material. An elongated and internally threaded sleeve 12 is secured to bracket 11 and threadingly receives an externally threaded shaft 13 having a point 14 which non-slippingly engages the gas pedal 15. Bracket 11 fits over and braces against the seat 16 of the vehicle and a wing nut 17 received upon threaded shaft 13 provides adjustment means for the length of car idler 10 in order to increase the r.p.m. of the engine by urging against the gas pedal 15.

What I now claim is:

An automobile idler device comprising, an L-shaped bracket, a telescoping shaft and sleeve for increasing engine speed, and adjustment means thereof, said externally threaded shaft being pointed at one end to non-slippingly engage a gas pedal and adjustment means for said idler device comprises a wing nut threadingly received upon said shaft and said wing nut provides locking means for the position of said extending shaft of said device when said wing nut abuts with and jams against the end of said sleeve of said device.

References Cited by the Examiner
UNITED STATES PATENTS
3,226,997   1/1966   Malloy _____ 74—532

OTHER REFERENCES
Joseph H. Allen: Popular Science, "Short Cuts and Tips," May 1959, page 199.

FRED C. MATTERN, Jr., *Primary Examiner.*
W. S. RATLIFF, *Assistant Examiner.*